United States Patent [19]

Hogan

[11] Patent Number: 5,456,752
[45] Date of Patent: Oct. 10, 1995

[54] GRADED FIBER DESIGN AND CONCRETE REINFORCED THEREWITH

[75] Inventor: Dennis J. Hogan, Austin, Tex.

[73] Assignee: Synthetic Industries, Chickamauga, Ga.

[21] Appl. No.: 136,395

[22] Filed: Oct. 13, 1993

Related U.S. Application Data

[63] Continuation-in-part of Ser. No. 679,752, Apr. 2, 1991, abandoned.

[51] Int. Cl.$^6$ .................................................. C04B 16/06
[52] U.S. Cl. ........................... 106/802; 106/644; 106/724
[58] Field of Search ................................. 106/802, 644, 106/711, 724, 727, 731, 738, 737

[56] References Cited

U.S. PATENT DOCUMENTS

| | | | |
|---|---|---|---|
| 2,793,130 | 5/1957 | Shannon et al. | 106/99 |
| 3,044,547 | 7/1962 | Jarboe, Jr. | 166/12 |
| 3,056,686 | 10/1962 | Shannon | 106/85 |
| 3,214,393 | 10/1965 | Sefton | 260/2.5 |
| 3,272,765 | 9/1966 | Sefton | 260/2.5 |
| 3,645,961 | 2/1972 | Goldfein | 260/37 N |
| 3,933,515 | 1/1976 | Yang | 106/99 |
| 4,306,911 | 12/1981 | Gordon et al. | 106/99 |
| 4,339,273 | 7/1982 | Meier et al. | 106/90 |
| 4,414,030 | 11/1983 | Restrepo | 106/90 |
| 4,565,840 | 1/1986 | Kobayashi et al. | 524/8 |
| 4,960,465 | 10/1990 | Arfaei | 106/724 |
| 4,968,561 | 11/1990 | Mizobe et al. | 428/397 |

FOREIGN PATENT DOCUMENTS 1406442  4/1972  United Kingdom.

OTHER PUBLICATIONS

"Properties of Graded Fibrillated Polypropylene Fiber Reinforced Concrete" by Bayasi, Department of Civil Engineering, San Diego State University, Sep. 1992.

"Post–Peak Flexural Strength of Synthetic Fiber Reinforced Concrete Using MD Polypropylene Fibers Manufactured by Fibermesh Company" by Bayasi, Department of Civil Engineering, San Diego State University, Feb. 1993.

"Post–Peak Flexural Strength of Synthetic Fiber Reinforced Concrete Using ¾" Monofilament Polypropylene Fibers Manufactured by Fibermesh Company" by Bayashi, Dept. of Civil Engineering, San Diego State Univ., Apr. 1993.

"Post–Peak Flexural Strength of Synthetic Fiber Reinforced Concrete Using ½" Monofilament Polypropylene Fibers Manufactured by Fibermesh Company" by Bayashi, Dept. of Civil Engineering, San Diego State Univ., May 1993.

*Primary Examiner*—Mark L. Bell
*Assistant Examiner*—Paul Marcantoni
*Attorney, Agent, or Firm*—Renner, Kenner, Greive, Bobak, Taylor & Weber

[57] ABSTRACT

Graded fiber additives of the present invention provide a mixture a fibers having a plurality of deniers, cross-sections and aspect ratios defining a plurality of different types wherein each type present in the mixture differs from every other type by at least one of denier, cross-section and aspect ratio, the plurality of types being designed and selected to provide optimum graded fiber distribution to accommodate the mortar factions common to proportioned concrete containing graded aggregate, and thereby to inhibit the initiation of cracking. Concrete and like materials having improved crack resistance comprise concrete and from about 0.025 to one percent by volume of fiber mixture providing a plurality of deniers, cross-sections and aspect ratios. The present invention further provides a methods for improving the crack resistance of concrete and like materials and for inhibiting the initiation of cracking comprising the steps of adding to a preselected amount of concrete a mixture of fibers having a plurality of deniers, cross-sections and aspect ratios defining a plurality of different types; and mixing the components sufficiently to distribute the fibers thoroughly throughout the concrete.

26 Claims, 5 Drawing Sheets

GRADED FIBER DESIGN AND CONCRETE REINFORCED THEREWITH

CROSS-REFERENCE TO RELATED APPLICATIONS

This application is a continuation-in-part of U.S. Ser. No. 07/679,752, filed Apr. 2, 1991, now abandoned.

TECHNICAL FIELD

The present invention relates to the reinforcement of concrete and like products via the use of synthetic fibers. These have an established record in the reinforcement of concrete as an alternative to wire mesh and are successful in inhibiting shrinkage cracking, increasing impact capacity, reducing permeability, adding shatter resistance and reducing construction time, in particular, a novel fiber design is provided by the present invention, as are improved concrete mixtures reinforced thereby.

BACKGROUND ART

The use of discrete fibers in the reinforcement of concrete is set forth in U.S. Pat. No. 3,645,961. The patent discloses the use of nylon, polyvinyl chloride and simple polyolefins in inches ranging between one-quarter to three inches (0.6 to 7.5 cm) to form a blast resistant concrete.

U.S. Pat. No. 4,306,911 teaches that water sensitive and water-insensitive fibers can be treated with materials that coat both types with a water-insoluble material. The resulting combination of filter fibers and reinforcing fibers can be used to produce asbestos-free fiber-reinforced cement products with similar product and performance properties.

British 1,406,442 discloses that reinforced concrete articles which contain fiber strands of at least two fibers twisted together have better tensile strength, crack control, impact resistance, toughness and energy absorption when subjected to destructive (e.g. explosive) loads. The result cannot be achieved merely be adding the strands to conventional concrete mixes, but require adjustments in coarse and fine aggregate volumes, and the inclusion of significant proportions, such as ten percent, of fines, such as pulverized fuel ash. A mixing aid, such a polyethylene oxide, is also recommended to enable increased amounts of fibers to be incorporated. Improvements in strengths depend upon a judicious combination of different degrees of length, cross-sectional dimensions and proportions of mixed fibers, leading to multiple cracking.

The use of fibrous materials made from nylon, polypropylene, polyvinylidene chloride and polyethylene is set forth in U.S. Pat. No. 3,645,961. Less than 3 percent of these fibers in lengths from ¼ to 3 inches (0.6 to 7.5 cm) can be mixed into concrete to make blast-resistant structures.

The use of fibrillaced polypropylene fibers from 0.05 to 2 percent by weight of the total wet mixture of water-hardenable inorganic materials is presented in U.S. Pat. No. 3,591,395.

Different fibers and polymer materials have been added to concrete and cement for a variety of purposes. U.S. Pat. No. 3,056,686 for instance, is directed toward a mass of glass reinforcement and a binder comprising an inorganic silicate. The invention resides in the binder, which is alkaline, but is reacted with an ion exchange material to prevent it from attacking the fiber glass reinforcement.

U.S. Pat. No. 2,793,130 provides a method for protecting glass fiber reinforcement in cement, which involves coating the glass fibers prior to contact with the cement. The coating comprises a water-soluble salt of a polyvalent metal, applied to the fibers, which is then treated with a material that can release hydroxy ions. The latter react in situ on the glass to form a water-insoluble reaction products with the soluble salt.

These patent references represent the significant prior art on the use of fibers in concrete over the last thirty-five years. This body of art addresses the use of fibers, alone or in combination with other materials, that perform primary reinforcing functions. The present invention addresses the issue of secondary reinforcement, as it applies to the prevention of shrinkage cracking and the behavior of the fibers covered by the invention after cracking under flexural stress.

Despite the fact that fibers and other materials have found great utility as additions to cement, concrete, precast products, mortar, stucco and the like, as secondary reinforcements, it has not been known heretofore to employ a plurality of fiber designs designed to an optimum gradation in one mixture for incorporation into concrete and like materials.

DISCLOSURE OF THE INVENTION

It is therefore an object of the present invention to provide a mixture of graded fibers for reinforcing concrete and like materials.

It is a further object of the present invention to provide a mixture of graded fibers having a plurality of different deniers, cross-sections and aspect ratios within the same mixture.

It is another object of the present invention to provide concrete and like materials having improved crack resistance, impact capacity, and shatter resistance.

It is still another object of the present invention to employ mixtures of various types of fibers within a blend for addition to concrete and like materials.

It is yet another object of the present invention to provide an improved method for reinforcing concrete and like materials.

It is a still further object of the present invention to provide a mixture of graded fibers, specifically selected to accommodate the proportions and sizes of the aggregate contained in the concrete, in order to inhibit the initiation of cracking.

At least one or more of the foregoing objects, together with the advantages thereof over the known fiber additives for concrete mixtures, which shall become apparent from the specification which follows, are accomplished by the invention as hereinafter described and claimed.

In general, the present invention provides graded fiber additives comprising a mixture of fibers having a plurality of deniers, cross-sections and aspect ratios defining a plurality of different types wherein each type present in the mixture differs from every other type by at least one of denier, cross-section and aspect ratio, the plurality of types being designed and selected to provide optimum graded fiber distribution to accommodate the mortar factions common to proportioned concrete containing graded aggregate, and thereby to inhibit the initiation of cracking.

The present invention also provides concrete and like materials having improved crack resistance comprising concrete and from about 0.025 to one percent by volume of a fiber mixture providing a plurality of deniers, cross-sections and aspect ratios defining a plurality of different types.

The present invention further provides a method for improving the crack resistance of concrete and like materials comprising the steps of adding to a preselected amount of concrete a mixture of fibers having a plurality of deniers, cross-sections and aspect ratios defining a plurality of different types; and mixing the components sufficiently to distribute the fibers thoroughly throughout the concrete.

The present invention also provides a method for inhibiting the initiation of cracking in concrete and like materials during curing stages comprising the steps of adding to a preselected amount of concrete a mixture of fibers having a plurality of deniers, cross-sections and aspect ratios defining a plurality of different types; and mixing the components sufficiently to distribute the fibers thoroughly throughout the concrete.

According to the present invention, it has been found that a mixture of fibers, graded in optimum fashion to provide a plurality of deniers, cross-sections and aspect ratios, will significantly reduce the tendency of concrete containing fibers of this type to shrink or to crack during drying shrinkage. The fibers are more uniformly distributed through the cement portion of a concrete blend, resulting in superior resistance to settling and separation of concrete during placing and drying. The more uniform blends yield better average finished product properties, such as impact strength and flexural strength than equal formula mixes that do not contain graded fibers. This uniformity is further demonstrated by superior retention of flexural properties after flexural stresses have caused the concrete to crack. This phenomenon occurs in cement, concrete, precast products, mortar, stucco and the like, and is markedly superior to equal amounts of non-graded fibers in the same blends. It is this novel and unexpected superiority that is the major object of the present invention.

PREFERRED EMBODIMENT FOR CARRYING OUT THE INVENTION

Figure 1:
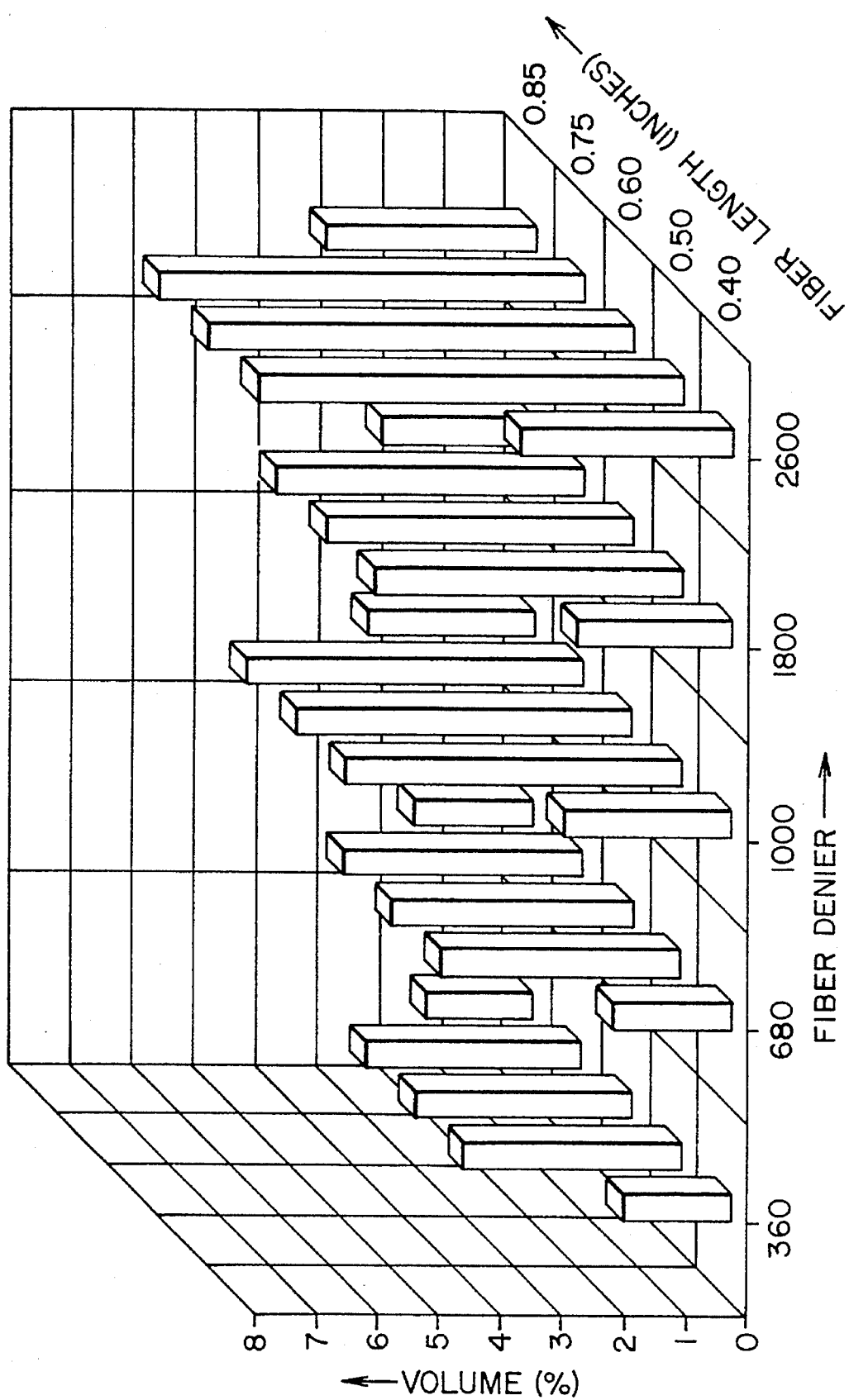
FIG. 1 is a graph schematically depicting 25 fiber designs that form a mixture of graded fibers according to the present invention.

The present invention relates to a novel mixture of synthetic reinforcing fibers which can be utilized for the reinforcement of concrete and like materials and is readily miscible therewith. More particularly, the fiber mixture is designed to provide rapid, thorough distribution of the fibers, even under less than ideal conditions or with less than perfect mixes, resulting in improved finishing and reduced plastic cracking. The present invention differs from the prior art which employs but a single fiber size, by providing a specific gradation of fiber design which can be blended more rapidly and thoroughly into all types of concrete mixtures including but not limited to, precast products, mortar, grout, shotcrete, cast in place concrete, stucco and the like, all of which generally comprise hardenable cement-like materials. The terms concrete or concrete mixtures shall be employed herein with the understanding that all types of concrete products are included such as those listed hereinabove.

Useful fibers for practice of the present invention include synthetic materials including polyolefins, such as polyethylene and polypropylene; polyesters; polyvinyl chloride; polyvinylidene chloride; polyamides and aromatic polyamides, such as KEVLAR®; polyacrylics, and mixtures thereof. Practical considerations include creep resistance, a strong trait of polyesters, and dispersibility of the fiber in the concrete mixture, although the absence of either one of these properties should not eliminate a particular polymer. Typically, thermoplastic fibers having specific gravities ranging from about 0.80 to 1.96 are suitable.

The fiber mixture is referred to herein as graded which means that a plurality of different lengths, width, thicknesses, deniers, fibrillation, cross-sections and/or aspect ratios are manufactured and combined together to form the mixture. In this manner, maximum density is obtained ensuring that some fibers will become incorporated into virtually every area of the mortar factions, or concrete paste, during mixing, and likewise in the cured product.

The term fibers as employed herein shall be understood to include monofilament and multifilament materials as well as slit films and sheets of synthetic materials which may also be fibrillated. Filamentary materials are not limited to cylindrical or round configurations but include all known cross-sectional configurations e.g., rectangular, square, round, oval, hollow, triangular, and the like. Additionally, tri-lobal multi-lobal, fibrillated, collated, bonded fibrils, entangled monofilaments or monofilaments and roll embossed film fibers are other practical types for concrete reinforcement. Hence, it is customary to refer to the denier of the material i.e., the weight in grams of a 9000 yard length, rather than diameter. Shape of the filamentary material is not a limitation either. As is known, configuration of the filaments can also be straight, crimped, slubbed, spiraled, gear crimped, saw-tooth configured, gnarled, cork-screwed or otherwise deformed and all of these types are included.

The present invention provides mixtures of graded fibers, as will be described in greater detail hereinbelow. It is to be understood that such mixtures encompass mixtures of one type of fiber, e.g., polypropylene, which is preferred, in different sizes; as well as mixtures of different fibers e.g., polyolefins and polyamides; and mixtures of different fiber configurations e.g., fibrillated materials and filamentary materials. In each instance, the mixture should also comprise a range of different fiber sizes, that is, the mixture should be graded. While all of the parameters, including different lengths, width, thicknesses, deniers, fibrillation, cross-sections and/or aspect ratios, need not be varied for each component of the graded mixture, it is to be understood that at least one or more parameters will vary between any two components.

Useful deniers range from about 15 to 2600 although broader ranges are not to be precluded. Preferred deniers range from about 360 to 2600. Similarly, the preferred lengths of the fibers range between about 0.4 to 0.85 inches (1 to 2.1 cm) although shorter and longer fibers, approximately 0.0625 and 3 inches (0.16 and 7.6 cm), respectively can be employed. Volume percentages of the shortest lengths range between about 2 to 4 percent; for the next three lengths, between about 4 to 8 percent; and for the next longest lengths, between about 2 to 3 percent, so as to total 100 percent by volume. Slit films and sheets will generally have thicknesses of from about 0.0001 to 0.01 inches (0.025 to 2.54 mm) and widths of from about 0.052 to 0.298 inches (1.32 to 7.57 mm) with 0.123 inches (3.12 mm) being preferred. Lengths are as noted hereinabove. Selection of the fiber designs for a mixture is related to the application. Generally speaking, mixtures of the shorter fibers are preferred for stucco and the like while the longer fibers are preferred for concrete.

With reference to the drawing figures, FIG. 1 is a three-dimensional representation of the distribution of fiber deniers, cut lengths, and volume percentages for five preferred fiber sizes. Each of the five sizes, expressed in denier (its weight in grams for 9000 meters) is cut to five different lengths, from 0.40 to 0.85 inches. Thus there are 25 combinations of volume percent by denier and cut length. One can determine by FIG. 1, for example, that 2600 denier fiber, cut 0.50, 0.60 and 0.75 inches in length, each make up about 6 percent by volume of the total 100 percent.

The 25 different fiber designs are the preferred combination for practice of this invention. Also, it is preferred that the shortest and longest fiber lengths comprise a smaller percentage of the total, while the intermediate lengths make up the majority. Minimally, at least three different fiber designs should be mixed together for practice of the present invention. In this instance, selections should be made from each end of the range as well as one from the middle e.g., fiber lengths of 0.4, 0.6 and 0.85 inches or the like. At the minimum range, the three different fiber designs selected are combined to provide 100 percent by volume of the graded fiber mixture. Preferably, more than three designs are combined, those selected being present in amounts of from about 2 to 8 percent by volume of the graded fiber mixture.

In FIG. 1, if the individual data points were presented as a cumulative distribution, the volume of each fiber length would describe one half of a bell-shaped curve. Similarly, a cumulative distribution of each fiber denier would describe one half a bell-shaped curve.

Figure 2:
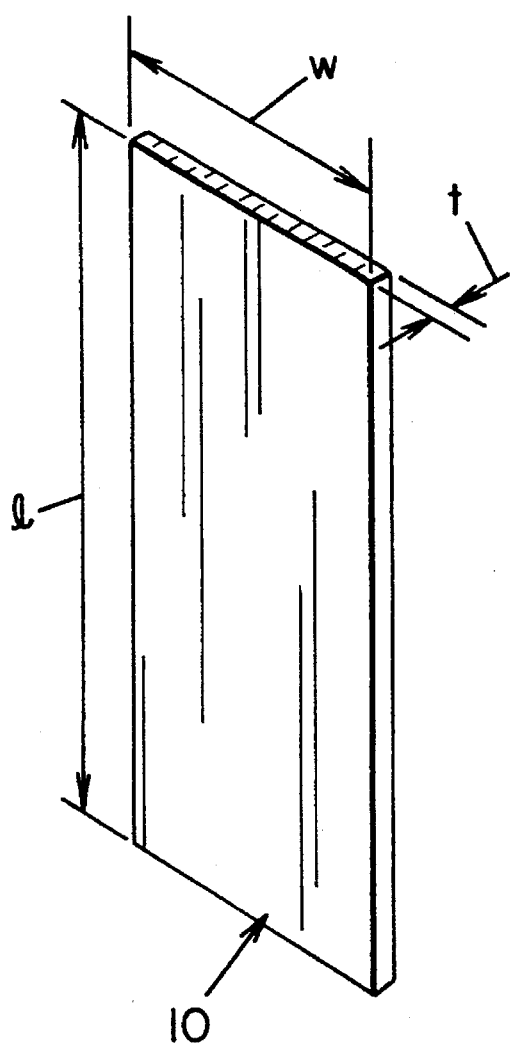
FIG. 2 is an enlarged view of a typical fiber component of the mixture according to the present invention.
Figure 3:
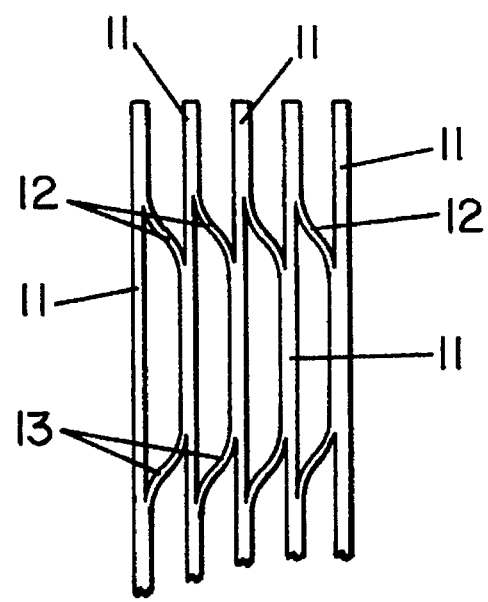
FIG. 3 is further enlarged view of a typical fiber component of the present invention, depicting fibrillation.

FIG. 2 represents an individual fiber strand 10 defined by its length (l), width (w), and thickness (t). By the process of fibrillation, the strand 10 is cut into smaller fibrils 11. FIG. 3 indicates that the fibrils consist of main members 11 and a multitude of connecting side members 12. The size of the various numbered components is defined not only by their length, width, and thickness, but also by their weight, expressed in denier. Additionally, the fiber is described by the relation of length to width, which is its aspect ratio.

As is known in the synthetic fiber industry, fibrillation is produced by forming large sheets of synthetic material which are first slit into ribbons and then distressed further to produce the fibrillation depicted in FIG. 3. Inasmuch as fibrillation per se, and the methods of producing it are known and do not constitute a novel aspect of the present invention, further detail shall not be provided.

The preferred distribution of deniers has been expressed in FIG. 1 as ranging from 360 to 2600 denier. Within this, the preferred aspect ratios vary broadly from about 10:1 to 30:1.

Additionally, the deniers expressed in FIG. 1 correspond to the fiber strand given in FIG. 2. The abrasive action of mixing these fibers into a concrete blend effectively separates most strands into the main fibrils and the side members depicted in FIG. 3. This added separation into smaller fractions enhances the effectiveness of the gradation process and materially enhances the claimed effects of the invention.

Addition of the fiber mixtures of the present invention to concrete mixtures and similar materials is conventional and merely requires that a quantity be incorporated during mixing and prior to pour or use. Generally, it is desirable to add graded fiber mixtures of the present invention at the rate of about 0.025 to about one percent by volume which, depending upon density of the fiber material, represents about 0.375 pounds to 15 pounds (0.17 to 6.8 Kg) for polypropylene, per cubic yard of concrete, with 0.1 percent by volume, or 1.5 pounds (0.68 Kg) per cubic yard being preferred. Similarly, the method of the present invention for improving the crack resistance of concrete and concrete materials includes the steps of adding a mixture of graded fiber designs, as described herein, to the concrete, and then mixing the components together sufficiently to disperse the fibers thoroughly within the concrete material.

In order to demonstrate the effectiveness of graded fiber mixtures in concrete as a secondary reinforcement, according to the present invention, tests were conducted involving the addition of graded, fibrillated polypropylene fibers, in varying amounts to concrete, followed by measurement of flexural strength. For comparison, fibrillated and monofilament polypropylene fibers and nylon monfilament of constant length, ½ inch (1.25 cm) and ¾ inch (1.9 cm) were also employed in separate specimens.

Samples were prepared and tested according to good concrete practices using ASTM and AASHTO standards and procedures.

Tests were conducted to compare concrete containing graded synthetic fibers with concrete containing single length fibers. Several performance parameters were compared at several fiber volume levels such as post crack integrity, impact resistance, permeability and shrinkage. The single length fibers tested included ½ inch (1.25 cm) fibrillated and ¾ inch (1.9 cm) fibrillated polypropylene, ½ inch (1.25 cm) monofilament and ¾ inch (1.9 cm) monofilament polypropylene and ¾ inch (1.9 cm) monofilament nylon.

As the data depicted in FIGS. 4–7 reveals, marked improvements of flexural behavior, and especially post-peak strength of concrete, resulting from the addition of graded fibers were obtained, clearly showing the efficiency of graded fibers in enhancing the flexural behavior of concrete. The post-peak performance is the measure of the ability of graded fibers to enhance secondary reinforcement properties. This result differs remarkably from prior art where the enhancement of primary properties such as compressive and flexural strength is claimed.

Figure 4:
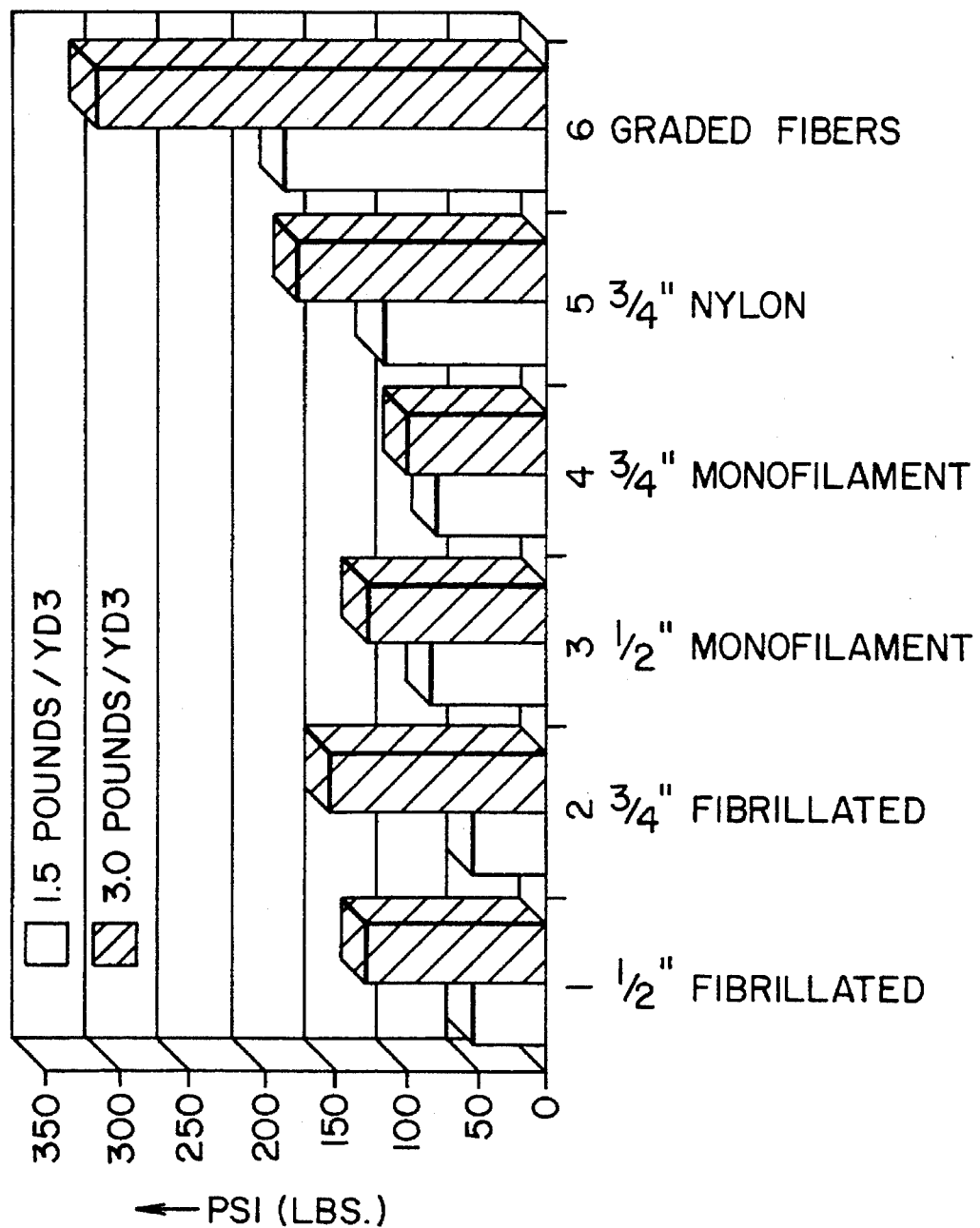
FIG. 4 is a graph depicting post peak flexural strength of concrete specimens reinforced by graded fibers of the present invention versus non-graded fibers of the existing art.
Figure 5:
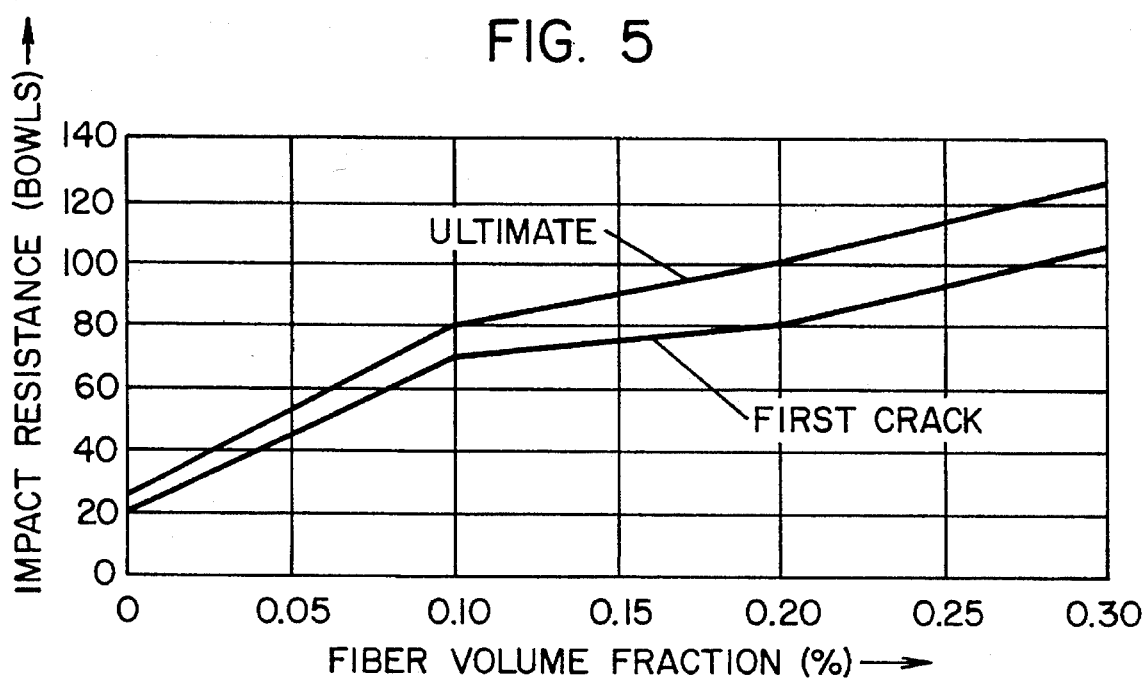
FIG. 5 is a graph depicting the increase in impact resistance for concrete reinforced with graded fibers as the fiber volume is increased.
Figure 6:
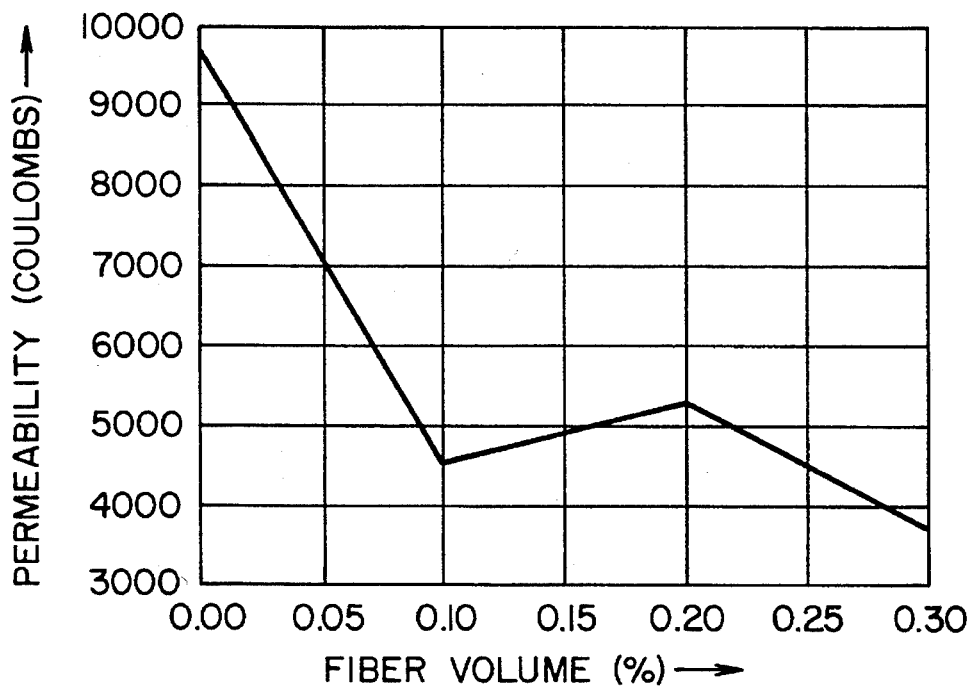
FIG. 6 is a graph depicting the reduction of permeability for concrete reinforced with graded fibers as the fiber volume is increased.
Figure 7:
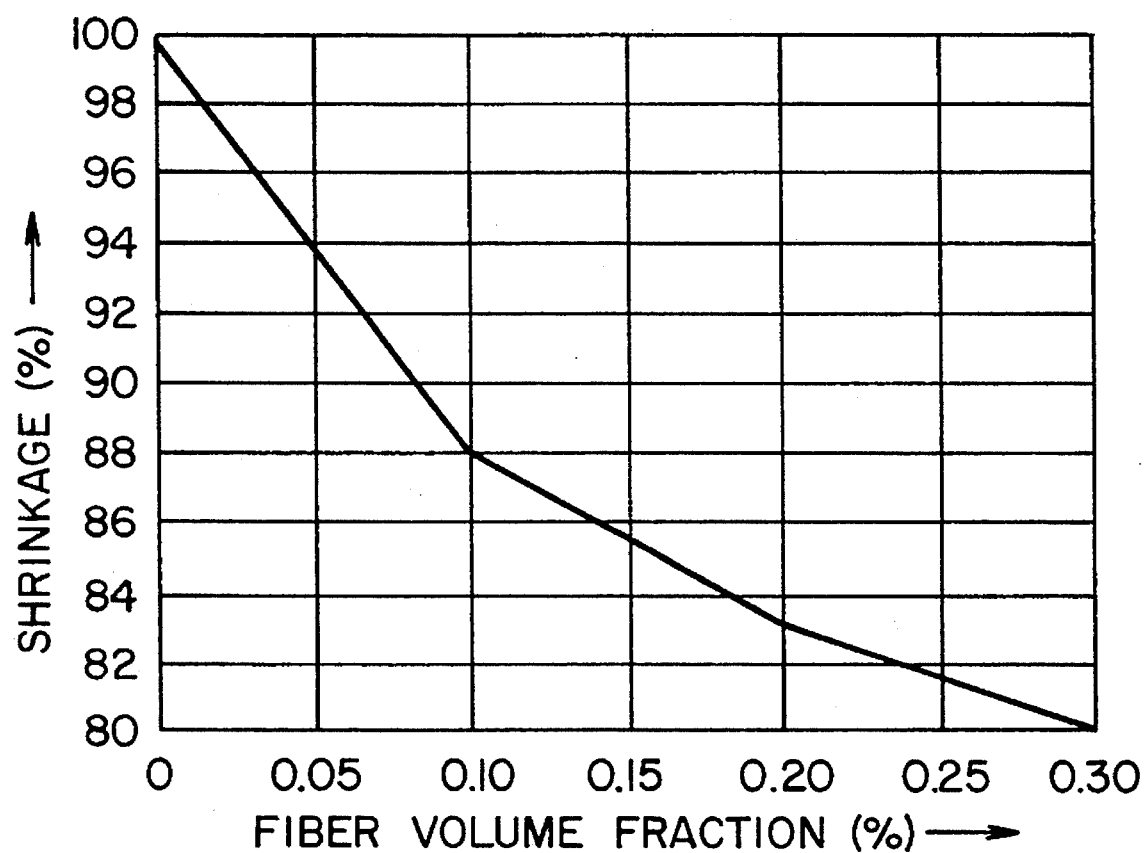
FIG. 7 is a graph depicting the reduction of drying shrinkage for concrete reinforced with graded fibers as the fiber volume is increased.

As is apparent from consideration of the data in FIG. 4, the use of graded fibers in specific amounts, 1.5 and 3 pounds per cubic yard, provided better flexural properties than the use of the uniform length, non-graded fibers. More particularly, FIG. 4 indicates that the graded fibers clearly enabled the test specimen to support greater load after rupture, even when peak flexural strength was not dramatically improved. This load carrying capacity is evidence that graded fibers are evenly distributed throughout all cement paste factions in the concrete, and therefore the fibers maintain a superior ability to support load no matter where the failure may occur.

Other measures of uniform distribution conducted with the same graded fiber-containing samples were impact resistance, permeability and shrinkage. Data from these tests were measured and plotted in FIGS. 5–7, respectively. In each case, the graded fibers provided progressively better impact, lower permeability and lower shrinkage as fiber content increase.

While the mixtures thus far have been described rather specifically, it is to be understood that practice of the present invention is not intended to be limited to the use of 25 different fiber designs, but rather that a large number of designs should be employed, not only two or three. In similar fashion, while the lengths, widths and thicknesses disclosed herein are preferred for concrete mixtures, it will be appreciated by those skilled in the art that these dimensions can be varied in order to accommodate the concrete or concrete material being reinforced, e.g., precast concrete, cast-in-place concrete, mortar, stucco, grout and the like. Preferably, however, the gradation of fiber designs employed will be selected to fit the half bell-shaped curves discussed hereinabove. Moreover, blends of different fiber types and/or fiber configurations can also be employed.

Based upon the foregoing disclosure, it should now be apparent that the present invention carries out the objects set forth hereinabove. It should also be apparent to those skilled in the art that a wide variety of fiber compositions can be employed and while the use of polypropylene fiber is preferred, it is to be understood that the present invention should not be limited thereto, as other fibers can be substituted. Similarly, the selection of fiber designs can be determined from the total disclosure provided herein. Likewise, the use of specific amounts of any particular component, or of the volume of the mixture added to the concrete, does not constitute a limitation on the present invention.

It is, therefore, to be understood that any variations evident fall within the scope of the claimed invention and thus, the selection of specific fibers, designs and amounts can be determined without departing from the spirit of the invention herein disclosed and described. Moreover, the scope of the invention shall include all modifications and variations that may fall within the scope of the attached claims.

What is claimed is:

1. Concrete having improved crack resistance consisting essentially of:
   concrete; and
   from about 0.025 to 1 percent by volume of a graded, synthetic fiber mixture, said graded fiber mixture containing, prior to its addition to said concrete, at least a first, second, and third plurality of fibers, each of said first, second and third plurality of fibers having deniers ranging from about 15 to about 3000 and lengths ranging from about 1/16 to about 1 inch;
   at least three pluralities of fibers having deniers different from each other such that at least one plurality of fibers has a denier at the lower end of the denier range, at least one plurality has a denier at the upper end of the range and at least one plurality has a denier in the middle of the range
   at least three pluralities of fibers having lengths different from each other such that one plurality of fibers has a length at the lower end of the range, one plurality has a length at the upper end of the range and one plurality has a length in the middle of the range;
   whereby initiation of cracking of the concrete is inhibited and flexural properties of the concrete are improved as compared to concrete reinforced by the addition of single length fibers.

2. Concrete, as in claim 1, wherein each said plurality of fibers is selected from the group consisting of polyolefins; polyesters; polyvinyl chloride; polyvinylidene chloride; polyamides; polyacrylics and mixtures thereof.

3. Concrete, as in claim 2, wherein at least one of said pluralities of fibers are made of polypropylene.

4. Concrete, as in claim 1, wherein said fiber mixture includes about 25 different pluralities of fibers.

5. Concrete, as in claim 1, wherein said fiber mixture includes at least two pluralities of fibers having different fiber configurations.

6. Concrete, as in claim 1, wherein said fiber mixture includes at least two pluralities of fibers having different cross-sectional configurations.

7. Concrete, as in claim 1, wherein each said plurality of fibers comprises from about 2 to 8 percent by volume of the fiber mixture.

8. A method for improving the crack resistance of concrete comprising the steps of:
   adding to a selected amount of concrete, a mixture of at least a first, second and third plurality of fibers, each of said first, second and third plurality of fibers having deniers ranging from about 15 to about 3000 and lengths ranging from about 1/16 to about 1 inch;
   at least three pluralities of fibers having deniers different from each other such that one plurality of fibers has a denier at the lower end of the range, one plurality has a denier at the upper end of the range and one plurality has a denier in the middle of the range;
   at least three pluralities of fibers having lengths different from each other such that one plurality of fibers has a length at the lower end of the range, one plurality has a length at the upper end of the range and one plurality has a length in the middle of the range; and
   mixing said components sufficiently to distribute said fibers uniformly throughout said concrete, said fibers being made of synthetic material, whereby initiation of cracking of the concrete is inhibited and flexural properties of the concrete are improved as compared to concrete reinforced by the addition of single length fibers.

9. A method, as in claim 8, wherein each said plurality of fibers is selected from the group consisting of polyolefins; polyesters; polyvinyl chloride; polyvinylidene chloride; polyamides; polyacrylics and mixtures thereof.

10. A method, as in claim 9, wherein at least one of said pluralities of fibers are made of polypropylene.

11. A method, as in claim 8, wherein said fiber mixture is added to said concrete in an amount of from about 0.025 to one percent by volume.

12. A method, as in claim 8, wherein said fiber mixture includes about 25 different pluralities of fibers.

13. A method, as in claim 8, wherein said fiber mixture includes at least two pluralities of fibers having different fiber configurations.

14. A method, as in claim 8, wherein said fiber mixture includes at least two pluralities of fibers having different cross-sectional configurations.

15. A method, as in claim 8, wherein each said plurality of fibers comprises from about 2 to 8 percent by volume of said fiber mixture.

16. A method for inhibiting the initiation of cracking in concrete during curing stages comprising the steps of:
   adding to a selected amount of concrete, a mixture of at least a first, second and third plurality of fibers, each of said first, second, and third plurality of fibers having deniers ranging from about 15 to 3000 and lengths ranging from about 1/16 to about 1 inch:

at least three pluralities of fibers having deniers different from each other such that one plurality of fibers has a denier at the lower end of the range, one plurality has a denier at the upper end of the range and one plurality has a denier in the middle of the range;

at least three pluralities of fibers having lengths different from each other such that one plurality of fibers has a length at the lower end of the range, one plurality has a length at the upper end of the range and one plurality has a length in the middle of the range; and mixing said components sufficiently to distribute said fibers uniformly throughout said concrete, said fibers being made of synthetic material.

17. Concrete consisting essentially of:

concrete; and from about 0.025 to 1 percent by volume of a graded, synthetic fiber mixture, said graded fiber mixture containing, prior to its addition to said concrete, at least a first, second, and third plurality of fibers, each of said first, second and third plurality of fibers having deniers ranging from about 15 to 3000 and lengths ranging from about 1/16 to 3 inches;

wherein said first, second and third plurality of fibers have deniers different from each other; and wherein at least three pluralities of fibers have lengths different from each other;

whereby initiation of cracking of the concrete is inhibited and flexural properties of the concrete are improved as compared to concrete reinforced by the addition of single length fibers.

18. Concrete, as in claim 17, wherein each said plurality of fibers is selected from the group consisting of polyolefins; polyesters; polyvinyl chloride; polyvinylidene chloride; polyamides; polyacrylics and mixtures thereof.

19. Concrete, as in claim 18, wherein at least one of said pluralities of fibers are made of polypropylene.

20. Concrete, as in claim 17, wherein said fiber mixture includes about 25 different pluralities of fibers.

21. Concrete, as in claim 17, wherein said fiber mixture includes at least two pluralities of fibers having different fiber configurations.

22. Concrete, as in claim 17, wherein said fiber mixture includes at least two pluralities of fibers having different cross-sectional configurations.

23. Concrete, as in claim 17, wherein each said plurality of fibers comprises from about 2 to 8 percent by volume of the fiber mixture.

24. Concrete having improved crack resistance consisting essentially of:

concrete; and from about 0.025 to 1 percent by volume of a synthetic fiber mixture, having deniers ranging from about 15 to about 3000 and lengths ranging from about 1/16 to about 3 inches, graded to provide a plurality of different lengths, widths, thicknesses, deniers, fibrillation, cross-sections or aspects ratios, prior to its addition to said concrete, so as to accommodate the mortar factions within said concrete and provide a continuous distribution of fibers therein;

whereby initiation of cracking of the concrete is inhibited as compared to concrete reinforced by the addition of single length fibers.

25. A method for improving the crack resistance of concrete comprising the steps of:

adding to a selected amount of concrete, from about 0.025 to 1 percent by volume of a synthetic fiber mixture, having deniers ranging from about 15 to about 3000 and lengths ranging from about 1/16 to about 3 inches, graded to provide a plurality of different lengths, widths, thicknesses, deniers, fibrillation, cross-sections or aspects ratios, prior to its addition to said concrete, so as to accommodate the mortar factions within said concrete and provide a continuous distribution of fibers therein; and mixing said components sufficiently to distribute said fibers uniformly throughout said concrete, whereby initiation of cracking of the concrete is inhibited as compared to concrete reinforced by the addition of single length fibers.

26. A method for inhibiting the initiation of cracking in concrete during curing stages comprising the steps of:

adding to a selected amount of concrete, from about 0.025 to 1 percent by volume of a synthetic fiber mixture, having deniers ranging from about 15 to about 3000 and lengths ranging from about 1/16 to about 3 inches, graded to provide a plurality of different lengths, widths, thicknesses, deniers, fibrillation, cross-sections or aspects ratios, prior to its addition to said concrete, so as to accommodate the mortar factions within said concrete and provide a continuous distribution of fibers therein; and mixing said components sufficiently to distribute said fibers uniformly throughout said concrete, whereby initiation of cracking of the concrete is inhibited as compared to concrete reinforced by the addition of single length fibers.

* * * * *